United States Patent [19]
Gottesman

[11] Patent Number: 5,898,766
[45] Date of Patent: Apr. 27, 1999

[54] METHOD FOR ENABLING A TRANSACTION BETWEEN A TERMINAL USER AND A SERVER

[76] Inventor: Victor Gottesman, 53, rue de l'Espérance, Clamart, France, 92140

[21] Appl. No.: 08/817,982

[22] PCT Filed: Oct. 30, 1995

[86] PCT No.: PCT/FR95/01431

§ 371 Date: Apr. 25, 1997

§ 102(e) Date: Apr. 25, 1997

[87] PCT Pub. No.: WO96/13815

PCT Pub. Date: May 9, 1996

[30] Foreign Application Priority Data

Oct. 28, 1994 [FR] France ................................ 94 12992

[51] Int. Cl.⁶ .................................................. H04M 15/00
[52] U.S. Cl. ...................... 379/127; 375/112; 375/91.02; 375/93.02
[58] Field of Search ..................... 379/111, 112, 379/130, 131, 127, 140, 141, 142, 91.01, 91.02, 93.02, 93.03; 235/380, 381, 381.5, 382; 340/825.33, 825.34

[56] References Cited

U.S. PATENT DOCUMENTS

| 5,333,181 | 7/1994 | Biggs ....................................... 379/144 |
| 5,511,114 | 4/1996 | Stimson et al. .......................... 379/144 |
| 5,550,897 | 8/1996 | Seiderman ............................... 379/144 |

*Primary Examiner*—Paul Loomis
*Attorney, Agent, or Firm*—Larson & Taylor

[57] ABSTRACT

The invention relates to performing a transaction between a user and a server. It relates to a method that comprises setting up a call (A3–A5) between a user and the server via an exchange, and transmitting user identification data to the server. According to the invention, the identification data is transmitted in two steps: a first step (A1–A2) prior to the call being set up (A3–A5) and in which data is read from a data medium; and a second step (A6) subsequent to the call being set up (A3–A5) and in which the identification data is transmitted by the exchange to the server. The method is applicable to telephone transactions

10 Claims, 3 Drawing Sheets

METHOD FOR ENABLING A TRANSACTION BETWEEN A TERMINAL USER AND A SERVER

FIELD OF THE INVENTION

The invention relates to a method of performing a transaction by telephone between a server and a user having an available terminal.

BACKGROUND OF THE INVENTION

In an ordinary telephone transaction performed between a terminal and a server via an automatic telephone exchange, a call is set up between a terminal and the server once the telephone exchange has identified the terminal (by its number which defines its physical connection and represents an account) so as to be able to charge the cost of the call to the account of the terminal, i.e. to the subscriber. There also exist cases where the cost of the call is charged to the account of the server ("800 numbers").

There also exist embodiments in which it is not the account of the terminal, i.e. of the subscriber, that is debited, but the account of a user. For example, a user having a memory card can call from a public telephone, and on the basis of information read from the memory card, the telephone exchange charges an account opened in the name of the user and identified by the memory card.

Document U.S. Pat. No. 4,933,966 relates to a system for verifying credit cards when setting up long distance calls. It does not relate to any transmission of identification data to a server after a call has been set up.

Document EP-A-0 494 530 relates to a system in which an exchange makes connections to various servers as a function of information coming from credit cards or as a function of an authorization code issued on the basis of data transmitted by a user. Billing is performed by the undertaking that manages the exchange. No identification data is transmitted to the server.

French patent No. 2 596 598 describes a very flexible system in which an exchange performs filtering operations by maintaining tables of authorized calls: the exchange enables calls to be set up either as a function of data relating to a terminal, or as a function of data relating to a user and carried by a data medium (badge, memory card, etc.).

In all those embodiments, the operations of determining which account to charge (terminal, user, server), or of authorizing a call, are independent of the server to which the terminal is to be connected once the call has been set up. More precisely, once a call has been set up between a terminal and a server in any of the above systems, either the server interchanges information with the terminal without knowing the identity of the caller (terminal or user), or else the server begins by performing a session for the purpose of determining whether the terminal or user participating in the transaction is indeed authorized to interchange information with the server. For example, when a bank customer calls the bank's server, the server identifies the user concerned because the user inputs information enabling the server to identify the caller (an access code). In other words, an interchange of information between the terminal and the server requires firstly that a call be set up under the authority of an exchange (public or private), and then once the call has been set up, it further requires a session during which the server asks the user for information (access code) telling the server that the user is indeed authorized to perform a transaction with the server.

The overall process therefore comprises two operations in which the terminal or the user partaking in the transaction is identified, firstly for the purpose of setting up the call (to determine an account to be charged), and subsequently for validating the interchange of information with the server (determining an account number, an access code, etc.).

SUMMARY OF THE INVENTION

An object of the invention is to provide a system in which these operations of identifying a terminal or a user are performed once only. More precisely, the invention relates to a system in which a public and/or private telephone exchange, once it has determined identification information that enables the call to be set up, transmits the necessary information to the server after call setup, such that a session during which the server identifies the terminal or the user is superfluous.

More precisely, the invention provides a method of performing a transaction between a user having an available terminal and a server whose service depends on the identity of the user, the method comprising setting up a call between the user having an available terminal and the server, via a public or private exchange, and transmitting to the server identification data relating to the user, and in which the call is set up in conventional manner by the user issuing a message determining the server with which the transaction is to be performed; according to the invention, the identification data is transmitted in two steps: a first step prior to the call being set up and in which the data is read from a data medium placed by the user in the available terminal; and a second step subsequent to the call being set up and in which the identification data is transmitted by the exchange to the server.

In an embodiment, the data medium inserted by the user in the terminal made available to the user carries identification data relating to the user, and said data is subsequently transmitted by the exchange to the server.

In another embodiment, the data medium that the user inserts in the available terminal includes a number, and the identification data relating to the user is determined in the exchange on the basis of the number read from the data medium. In this embodiment, when the exchange comprises both a private exchange and a public exchange, it is preferably the private exchange which determines the identification data of the user.

In certain embodiments, it is advantageous for the exchange to transmit monetary data to the server in addition to the identification data relating to the user, and for the server to transmit monetary data to the exchange at the end of the transaction with the user. For example, the monetary data could relate to a user account held by the exchange.

The invention also relates to a voice server for implementing the above method and for performing at least one messaging function in which the addressee must be identified before messages are transmitted.

BRIEF DESCRIPTION OF THE DRAWINGS

Other characteristics and advantages of the invention appear better on reading the following description made with reference to the accompanying drawings, in which.

DESCRIPTION OF THE PREFERRED EMBODIMENTS

In the description that follows, it is assumed that the identification data relating to a user is obtained by reading a data medium (badge, memory card, etc.) that a user inserts into a reader. The reader may be included in a telephone terminal used by the user, or placed in the vicinity thereof Such a system is described, for example, in French patent application No. 2 596 598. It has the advantage of providing a high degree of security in use, particularly in premises frequented by several people. However, the invention can also be implemented with an ordinary telephone terminal having no reader for such a data medium Under such circumstances, the identification data relating to the user for the purposes of the present specification is either the subscriber number corresponding to the terminal or else identification data associated with said subscriber number in the exchange (whether private or public) used for setting up the call. The invention can also be implemented with any wired or wireless telephone terminal (radio-connected, infrared-connected, etc.), e.g. a mobile telephone, in particular a digital telephone such as in the GSM system.

In both preceding cases, the relevant identification data relating to the user is either full user identification data or else a portion thereof not including user identification in full.

Figure 1:
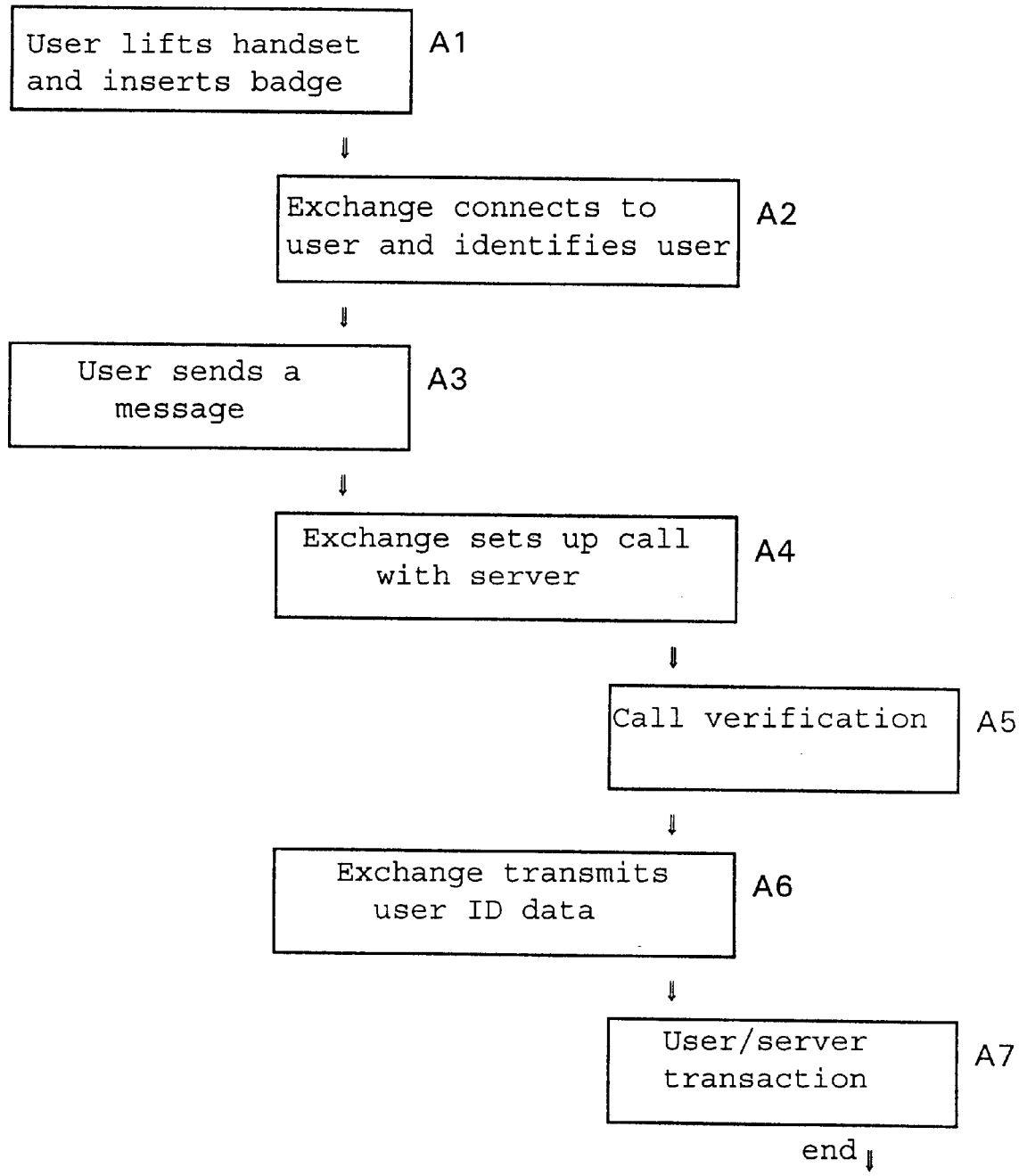
FIG. 1 is a block diagram of the operations performed when implementing a method of the invention.

With reference to the block diagram of FIG. 1, there follows a description explaining how a transaction is performed by implementing the invention in the above-specified context of a reader being present for reading the data medium.

In step A1, the user lifts the telephone handset of the terminal concerned, and then inserts the data medium into the reader; in a variant, the data medium is inserted before lifting the handset.

In step A2, the exchange detects that the user has lifted the handset and identifies it. This identification may possibly be performed in full or in part by information being interchanged between the exchange and the terminal. The exchange then has identification data relating to the user available to it.

In step A3, the user presses keys on the terminal to transmit a message requesting a call, e.g. comprising the number of the server which the user desires to access. In an example, it is assumed that the user seeks to set up a call with the server of the local electricity utility.

In step A4, the exchange sets up the call, and step A5 corresponds to verifying that the call has been set up by interchanging appropriate call setup data between the exchange and the server.

In step A6, the exchange uses the method of the invention to transmit user identification data to the server. This identification data is either the data obtained during step A2, or data derived from said identification data, or data of both of these types.

In step A7, possibly after the server has acknowledged receipt of said data, a transaction is performed between the user and the server. When the transaction is finished, the call is cleared down in conventional manner.

In the above example in which the server is the user's electricity utility, the server knows the user with which it is in communication and can communicate data relating to the user's account. Since the user has been identified, the server can, for example, initiate automatic direct debiting of a bill if, during the transaction, the user instructs the server to do that.

Although separate steps A1 to A3 are described for lifting the handset and inserting a badge, connecting and identifying the user, and the user sending a message, that is merely one way in which those operations can be performed. For example, the message may be contained in the badge, so there is no need for the user to issue the message. Also, the badge may be inserted before lifting the handset. Similar remarks apply equally well to the other embodiments described below.

Figure 2:
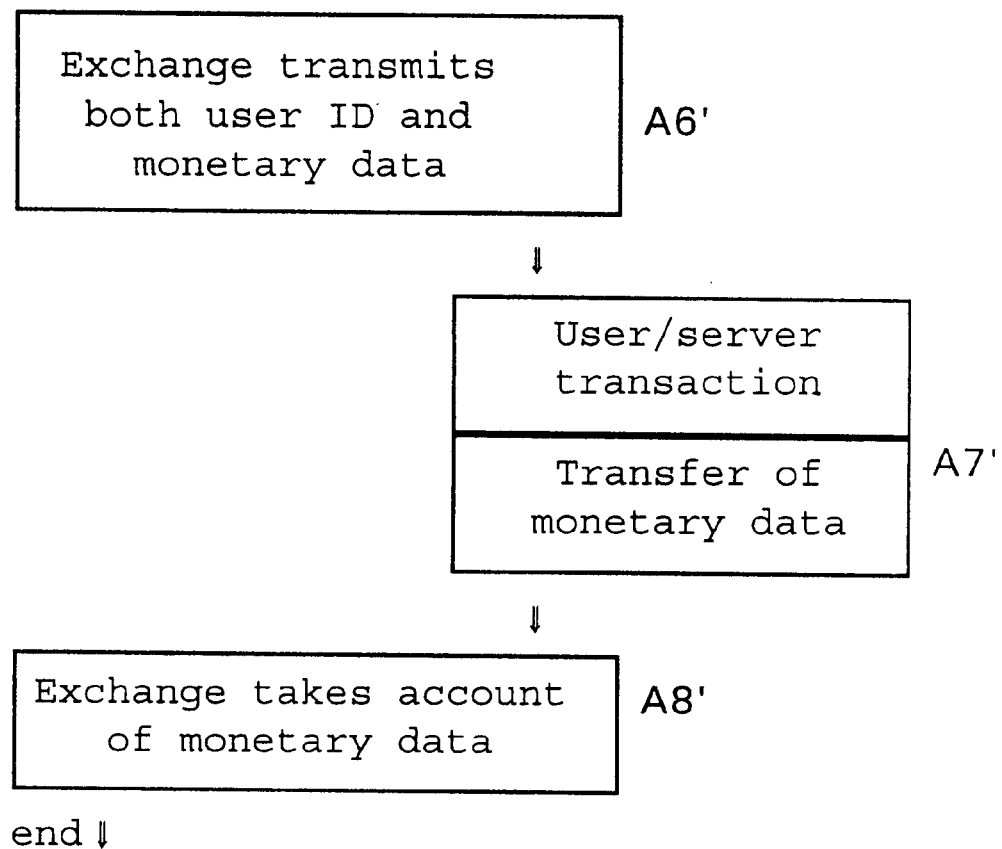
FIG. 2 shows a variant ending of the operations in the method shown in FIG. 1.

FIG. 2 shows a variant of the above method. In step A6' which replaces step A6, the exchange not only transmits identification data concerning the user, but also adds monetary data thereto, e.g. the balance of an account. In step A7', not only is the transaction performed with the user, as in the example of FIG. 1, but also, at the end of the transaction, in step A8', the server transmits other monetary data to the exchange and the exchange takes the new monetary data into account. For example, when the exchange has transmitted an account balance to the server, the server may return a new balance to the exchange, with the balance being reduced or increased by an amount relating to the transaction performed.

Figure 3:
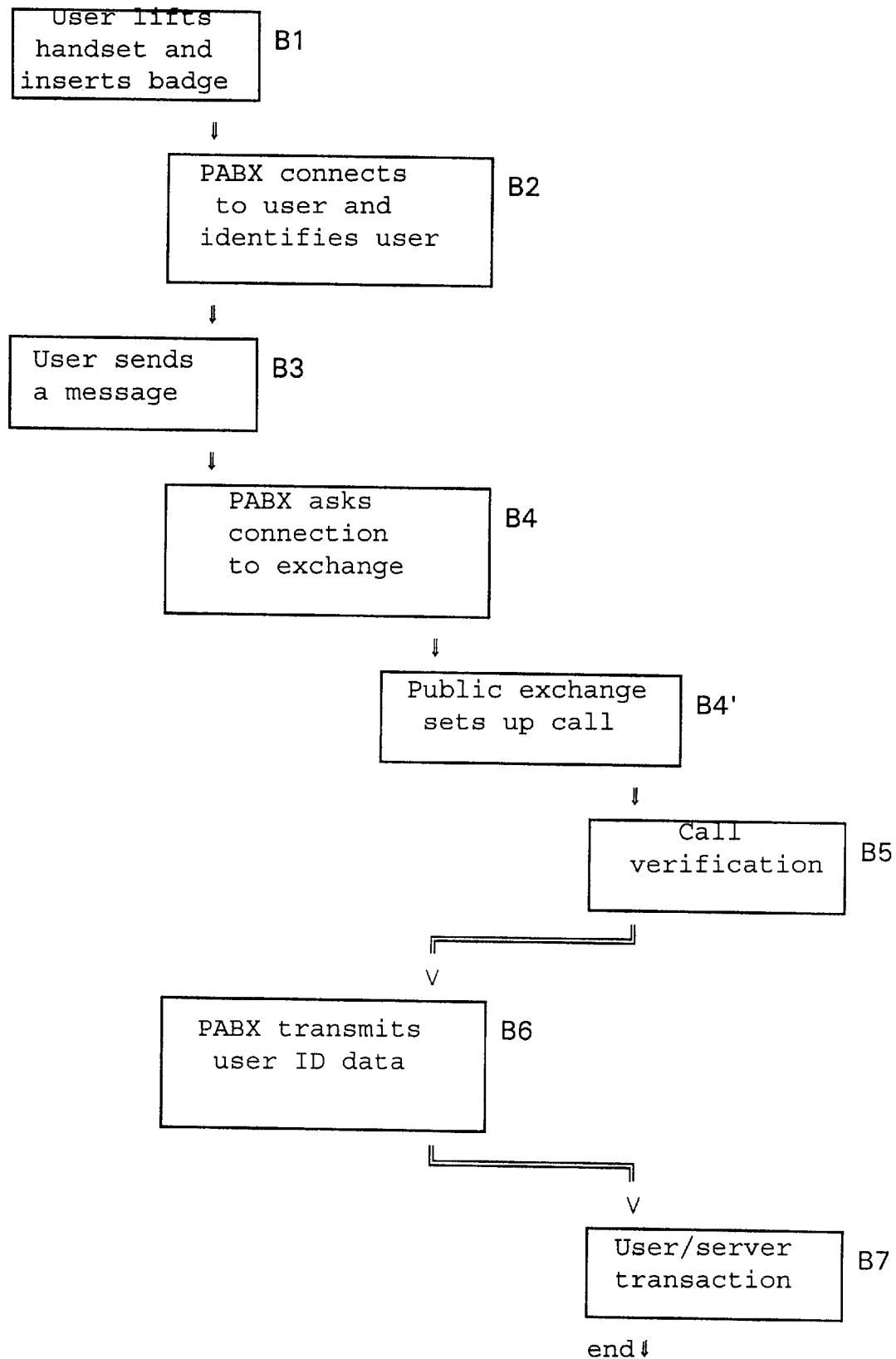
FIG. 3 shows a variant implementation of the method of the invention.

FIG. 3 shows another implementation of the method shown in FIG. 1. In this method, the FIG. 1 exchange is replaced both by a private exchange and by a public exchange. Step 31 is identical to step A1, i.e. the user lifts the handset and inserts the data medium. In step B2, analogous to step A2, the private exchange takes the line and determines the identification data relating to the user. Step B3 is identical to step A3, the user issuing the message specifying the server with which a transaction is to be performed.

In step B4, the private exchange sets up a call to the public exchange, however, it may also perform call filtering, i.e. it may refuse access to certain servers. In step B4', the public exchange verifies that the requested service is indeed available and sets up the call. Steps B4 and B4' thus correspond to step A4.

Step B5, analogous to step A5, verifies that the call has been set up by the public exchange. After step B5, the server is in communication with the private exchange such that during step B6, the private exchange can transmit to the server the identification data relating to the user as obtained in step B2. The transaction can now take place between the user and the server in step B7 which corresponds to step A7.

Naturally, the variant of FIG. 2 can also be applied to the method shown in FIG. 3.

The above embodiments are particularly advantageous in the context of the method and the installation constituting the subject matter of French patent No. 2 596 598. The present invention further extends the field of application of the method and the installation of the above document by simplifying and speeding up calls set up with a very wide variety of servers. Such a system is particularly advantageous because it enables a very large number of services to be centralized, either merely within a firm (the exchange is a private exchange), or else via the public telephone network.

Although the method of the invention is described in an embodiment in which the second step of transmitting identification data constitutes the only step of validating identification data that needs to be performed by the server for the purposes of the transaction, it is clearly possible to add a conventional type of validation step (inputting an access code, etc.) to the above step. Under such circumstances, transaction security is considerably increased, and the possibilities of fraud by ill-intentioned third parties are practically zero. Such a third party must not only have possession of the data medium (which might be found or stolen), but must also know the access codes.

Although the method of the invention has been described in the context of setting up a call, it should be observed that this operation does not necessarily correspond to a physical connection. In digital and other networks, physical connections can be established on a quasi-permanent basis via a channel that remains connected (e.g. the D channel of the ISDN network).

Also, although the invention is described in the context of examples where the identification data relates to the user, i.e. comes from the badge, the data may also include a portion that depends on the installation, e.g. the physical number of the line, particularly when advanced telephone functions are implemented in cooperation with the invention (e.g. call forwarding).

A particularly advantageous application of the invention relates to transactions performed with a voice server. It is very useful for the voice server to know who the caller is, e.g. in order to supply the contents of a letterbox in a messaging function. Clearly the server must know who the caller is in order to give only those messages that concern that caller. The other functions of a voice server also benefit from knowing who the caller is, as obtained by implementing the invention. For example, the user can give the server messages or data for other users and that remain valid for a certain amount of time only, e.g. as specified by the user. These messages or data can be deleted either automatically when the time has elapsed, or else only after the time has elapsed and the first user has confirmed that they should indeed be deleted. For this confirmation function, it is essential for the server to be sure of the identity of the initial user.

Naturally, the invention is described and claimed only by way of preferred example and any equivalents could be used for the component elements thereof without going beyond the ambit of the invention.

I claim:

1. A method of performing a transaction between a user having an available terminal and a server whose service depends on the identity of the user, said method comprising setting up a call between the user having an available terminal and the server, via a public or private exchange, and transmitting by the exchange to the server identification data relating to the user, the call being set up by the user issuing a message determining the server with which the transaction is to be performed, and said method further comprising transmitting the identification data in first and second steps wherein in said first step prior to the call being set up, the data is read from a data medium placed by the user in the available terminal; and wherein, in said second step, subsequent to the call being set up, but before the call is cleared down, the identification data is transmitted by the exchange to the server.

2. A method according to claim 1, the information medium inserted by the user into the available terminal carries identification data relating to the user, and said data is transmitted as such subsequently by the exchange to the server in the second step of transmitting identification data, subsequent to the call being set up.

3. A method according to claim 1, characterized in that the data medium that the user inserts in the available terminal includes a number, and the identification data relating to the user is determined in the exchange on the basis of the number read from the data medium.

4. A method according to claim 3, wherein the method is implemented with an exchange comprising both a private exchange and a public exchange, and wherein the user identification data is determined by the private exchange.

5. A method according to claim 1, wherein the exchange transmits to the server, not only identification data relating to the user, but also monetary data, and at the end of the transaction with the user, the server transmits monetary data to the exchange.

6. A method according to claim 5, wherein the monetary data relates to a user account held by the exchange.

7. A voice server for performing a transaction with a user having an available terminal wherein performing said transaction includes at least one messaging function in which the user must be identified by identification data relating to the user before messages are transmitted, the transaction being performed by a method which includes a step in which the data is read from a data medium placed by the user in the available terminal, and a subsequent step of setting up a call between the user having an available terminal and the server, via a public or private exchange, the call being set up by the user issuing a message determining the server with which the transaction is to be performed, said exchange identifying said user by said identification data relating to the user, and said voice server including means for receiving, subsequent to the call being set up, but before the call is cleared down, identification data relating to the user and transmitted by the exchange.

8. A voice server according to claim 7 wherein, a user can transmit messages or data to the server destined for other users, and said server provides that said messages or data are valid for a certain length of time only.

9. A voice server according to claim 7, at the end of a time period during which the messages or data are valid the server deletes, said messages or data automatically.

10. A voice server according to claim 7 wherein, at the end of a time period during which said messages or data are valid, the server provides that deletion takes place only if the user who transmitted said messages or data confirms such deletion.

* * * * *